United States Patent
Montojo et al.

(10) Patent No.: US 7,266,156 B2
(45) Date of Patent: Sep. 4, 2007

(54) METHOD AND APPARATUS FOR REDUCING PEAK TO AVERAGE POWER RATIO OF A MULTI-CARRIER SIGNAL

(75) Inventors: Juan Montojo, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 10/132,992

(22) Filed: Apr. 26, 2002

(65) Prior Publication Data
US 2003/0202611 A1 Oct. 30, 2003

(51) Int. Cl.
*H04B 7/02* (2006.01)

(52) U.S. Cl. .............. 375/267; 375/146; 375/299

(58) Field of Classification Search .......... 375/141, 375/146, 260, 261, 267, 279, 284, 285, 296, 375/297, 298, 299, 308
See application file for complete search history.

(56) References Cited

U.S. PATENT DOCUMENTS

| | | | |
|---|---|---|---|
| 6,044,103 A | | 3/2000 | Weaver, Jr. |
| 6,236,864 B1 | | 5/2001 | McGowan et al. |
| 6,249,539 B1 | * | 6/2001 | Harms et al. ............ 375/130 |
| 6,310,869 B1 | | 10/2001 | Holtzman et al. |
| 6,330,289 B1 | * | 12/2001 | Keashly et al. ............ 375/297 |
| 6,411,645 B1 | * | 6/2002 | Lee et al. ............ 375/140 |
| 2001/0038065 A1 | | 11/2001 | Kimura |

FOREIGN PATENT DOCUMENTS

| | | | |
|---|---|---|---|
| JP | 2001168837 A | * | 6/2001 |
| KR | 2001069611 A | * | 7/2001 |

* cited by examiner

*Primary Examiner*—David B. Lugo
(74) *Attorney, Agent, or Firm*—S. Hossain Beladi; Jonathan T. Velasco; Thomas R. Rouse

(57) ABSTRACT

An apparatus and method provide for producing a multi-carrier signal at a reduced peak to average power ratio. A control system (401) determines a number of carriers in multi-carrier signal, determines chip time of a spreading sequence used for spreading the number of carriers and determines delay time for each of the number of carriers based on the determined number of carriers and the determined chip time. Delay blocks (512B, 512C) delay the number of carriers by the determined delay time. A combiner (502) combines the delayed carriers to produce a reduced peak to average power ratio multi-carrier signal (504). A transmitter (500) transmits the reduced peak to average power ratio multi-carrier signal (504). The transmitter (500) may include an amplifier (520) for amplifying the reduced peak to average power ratio multi-carrier signal (504) before transmitting.

20 Claims, 7 Drawing Sheets

METHOD AND APPARATUS FOR REDUCING PEAK TO AVERAGE POWER RATIO OF A MULTI-CARRIER SIGNAL

FIELD

The present invention relates generally to the field of communications, and more specifically, to multi-carrier communications.

BACKGROUND

The communication channels between a transmitter and a receiver may be transmitted over a bundle of several carriers. The carriers may be combined and amplified before transmission. The power amplifier used for amplification of the transmitted signal may have a limited linear operating range. Generally, operation of a power amplifier within its linear operating range reduces the undesired inter-modulation products that may be generated in the amplifier. In order to maintain the power amplifier within its linear operating range, the peak to average ratio (PAR) of the input signal is kept at a low level. One or more method and apparatus has been disclosed in the U.S. Pat. Nos. 6,044,103, and 6,310,869, and the U.S. publication No. 2001/0038065, all incorporated by reference herein. In case of multi-carrier transmission, the PAR of the combined signal may not be controlled without substantial processing of each individual carrier signal and the combined signal. Therefore, there is a need for a method and apparatus for reducing the PAR of a combined signal in a multi-carrier transmission system.

SUMMARY

Method and apparatus for reducing peak to average power ratio of a multi-carrier combined signal are disclosed. A control system determines a number of carriers in the multi-carrier signal, determines chip time of a spreading sequence used for spreading the number of carriers and determines a delay time for each of the number of carriers based on the determined number of carriers and the determined chip time. Delay blocks delay the number of carriers by the determined delay time. A combiner combines the delayed carriers to produce a reduced peak to average power ratio multi-carrier signal. A transmitter transmits the reduced peak to average power ratio multicarrier signal. The transmitter may include an amplifier for amplifying the reduced peak to average power ratio multi-carrier signal before transmitting.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, various aspects of the invention allow producing a multi-carrier signal at a reduced peak to average power ratio (PAR). In accordance with at least one aspect of the invention, a delay element is used to delay each carrier of the multi-carrier signal by an amount of delay before combining the signals. The resulting signal has a reduced PAR. A power amplifier while allowing the power amplifier to remain in its linear operating region may amplify the resulting signal.

One or more exemplary embodiments described herein are set forth in the context of a digital wireless communication system. While use within this context is advantageous, different embodiments of the invention may be incorporated in different environments or configurations. In addition, various embodiments of the invention may involve communication systems operating in accordance with the frequency division multiple access (FDMA) techniques. In a FDMA system, several carriers at different frequencies may be combined to form a multi-carrier signal. The multi-carrier signal may be used for communications. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
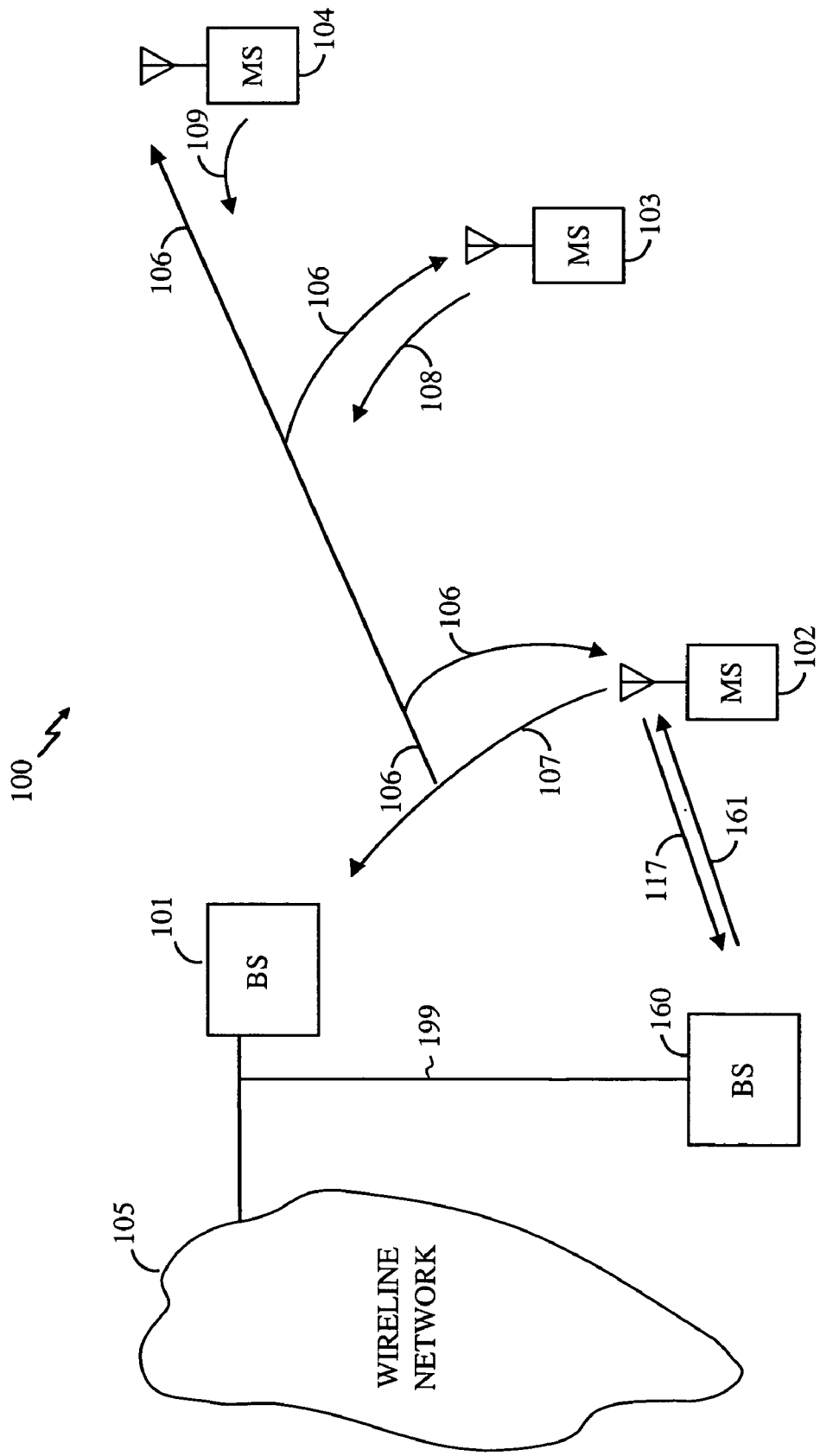
FIG. 1 depicts a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. The forward link signal 106 may be a multi-carrier forward link signal. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 communicate with base stations 101 and 160 via corresponding reverse links 117. Each reverse link 117 is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link 161 base station 101 transmits on forward link signal 106, and base station 160 on the forward link signal 161. On the reverse link 117 mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102.

The communication system 100 may also employ use of pilot channels for proper decoding of various channels. A pilot channel contains a series of predefined data. A receiver receives the pilot channel to determine various characteristics of the propagation channel. One of the characteristics may be a carrier to interference ratio (Ec/Io) of the pilot channel. The pilot channel may be used to decode other received channels. The forward and reverse links may have pilot channels. On the forward link, a base station may transmit a pilot channel for all the mobile stations in its coverage area. On the reverse link, each mobile station may combine the reverse link channels with a pilot channel.

Figure 2:
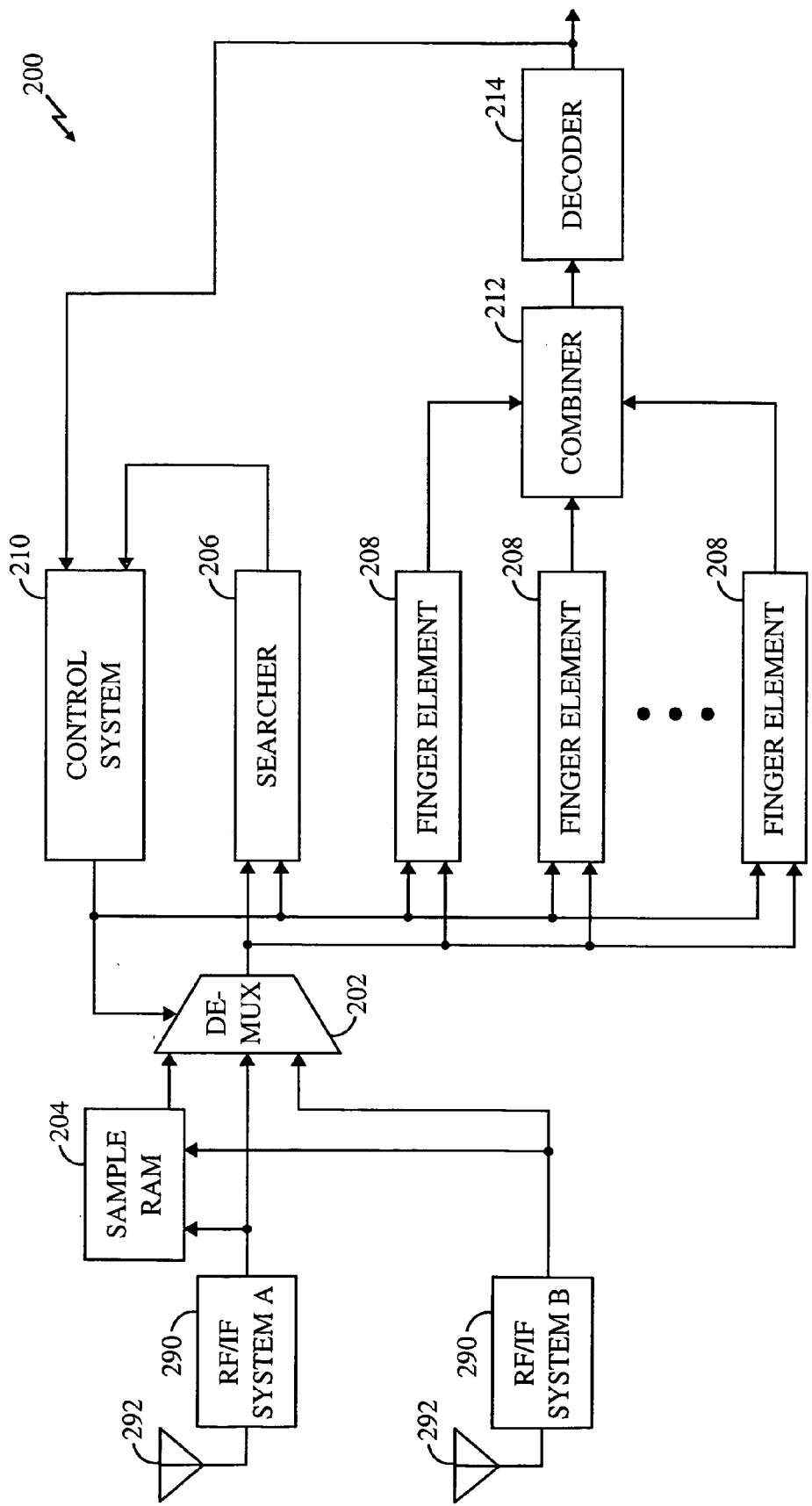
FIG. 2 depicts a communication system receiver for receiving and decoding received data.

FIG. 2 illustrates a block diagram of a receiver 200 used for processing and demodulating the received CDMA signal. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multi-carrier signals and RF/IF processing of the received signals. For example, RF/IF system 290 may include the RF/IF systems 290A and 290B, each being considered a receiver chain. More than two receiver chains may also be used. Each element of antenna system 292 receives a multi-carrier signal, and passes the received multi-carrier signal to a receiver chain in the RF/IF system 290. Each receiver chain may be tuned to a particular carrier frequency to process one or more of the carriers in the received multi-carrier signal. RF/IF system 290 may be any conventional RF/IF receiver. The RF/IF system 290 may be a "zero" intermediate frequency (ZIF) receiver. The received RF signals are filtered, down-converted and digitized to form RX samples at base band frequencies. The samples are supplied to a demultiplexer (demux) 202. The output of demux 202 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to demux 202. Demux 202 supplies the samples to searcher unit 206 and finger elements 208. Control system 210 configures finger elements 208 to perform demodulation and despreading of the received signal at different time offsets based on search results from searcher unit 206. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. The searcher 206 may decode the pilot channel to determine the channel condition, such as determining Ec/Io. If the Ec/Io of the pilot channel of the transmitting source is above a threshold, the control system 210 may decide to assign finger elements 208 to process other received channels from the same source. In the mobile station, various lists of base stations with adequate pilot channel Ec/Io are kept. The lists may include an active list of base stations, a candidate list of base stations, a neighboring list of base stations and a remaining list of base stations. The lists of the base stations may be organized in accordance with the received Ec/Io level. The base stations in the active list have the strongest received Ec/Io. Receiver 200 may be used in a receiver portion of base stations 101 and 160 for processing the received reverse link signals from the mobile stations, and in a receiver portion of any of the mobile stations for processing the received forward link signals.

Figure 3:
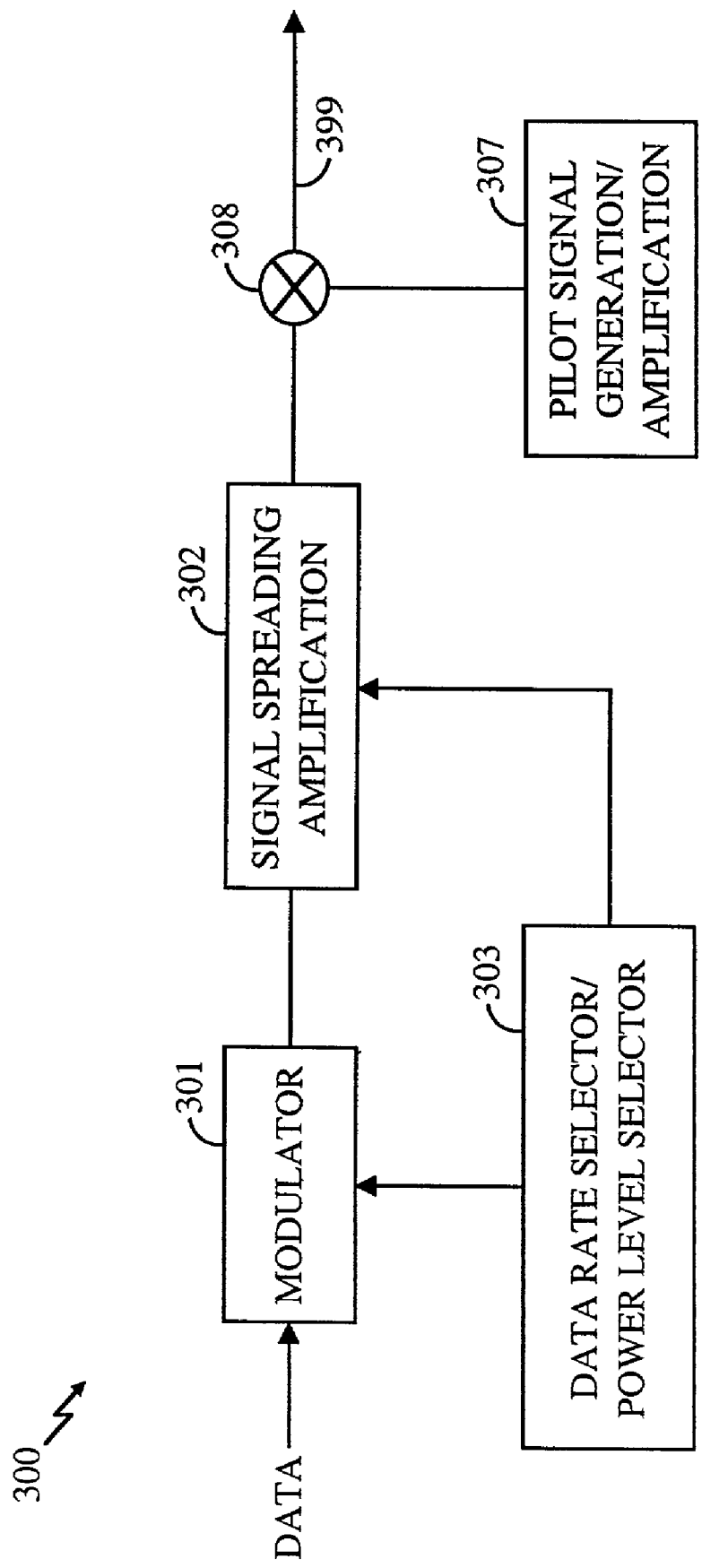
FIG. 3 depicts a communication system transmitter for transmitting data.

FIG. 3 illustrates a block diagram of a transmit channel processing block 300 for producing a signal 399, which may include a combination of two or more channels. The signal 399 may be used for one of the carriers in the multi-carrier transmission on the forward link or reverse link. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission. The data rate and power level selector 303 also selects a power level for the amplification level of the transmitted signal in accordance with the feedback information. The combination of the selected data rate and the power level allows proper decoding of the transmitted data at the receiving destination. The transmit power level may be limited within a predefined range. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The resulting combined signal 399 may be used for transmission via a multi-carrier single.

Figure 4:
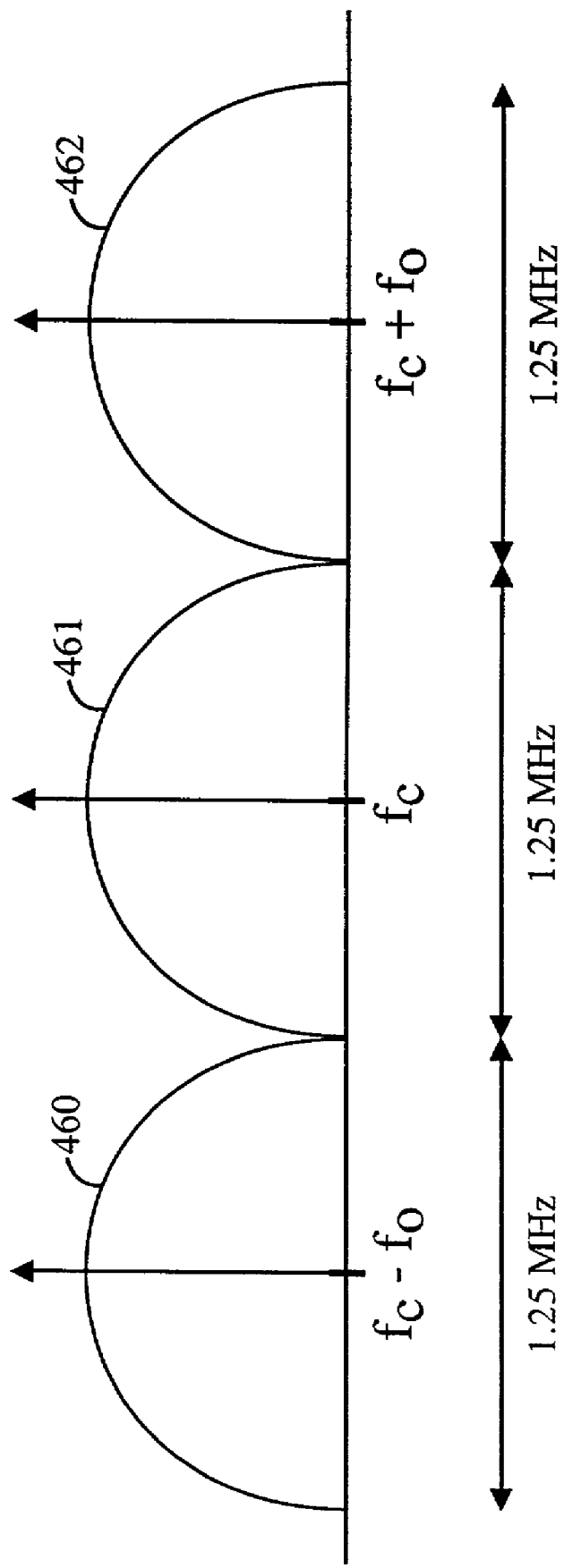
FIG. 4 depicts an exemplary frequency spectrum of a single carrier signal and multi-carrier signal.

FIG. 4 illustrates frequency spectrum of a single carrier and multi-carrier signal, which are helpful in understanding various aspects of the invention. When signal 399 is up-converted at the carrier frequency "fc", the carrier spectrum may appear as the curve 461. The bandwidth of the signal may be equal to 1.25 MHz, for example. If a three-carrier signal is used, three signals such as signal 399 are each up-converted to different frequencies to form a multi-carrier signal. The frequency of one of the multi-carrier signal may be at "fc", another at "fc−fo" and another at "fc+fo". As a result, the curves 460, 461 and 462 show the multi-carrier spectrum. The bandwidth of each carrier in the multi-carrier signal may be the same or different.

Figure 5:
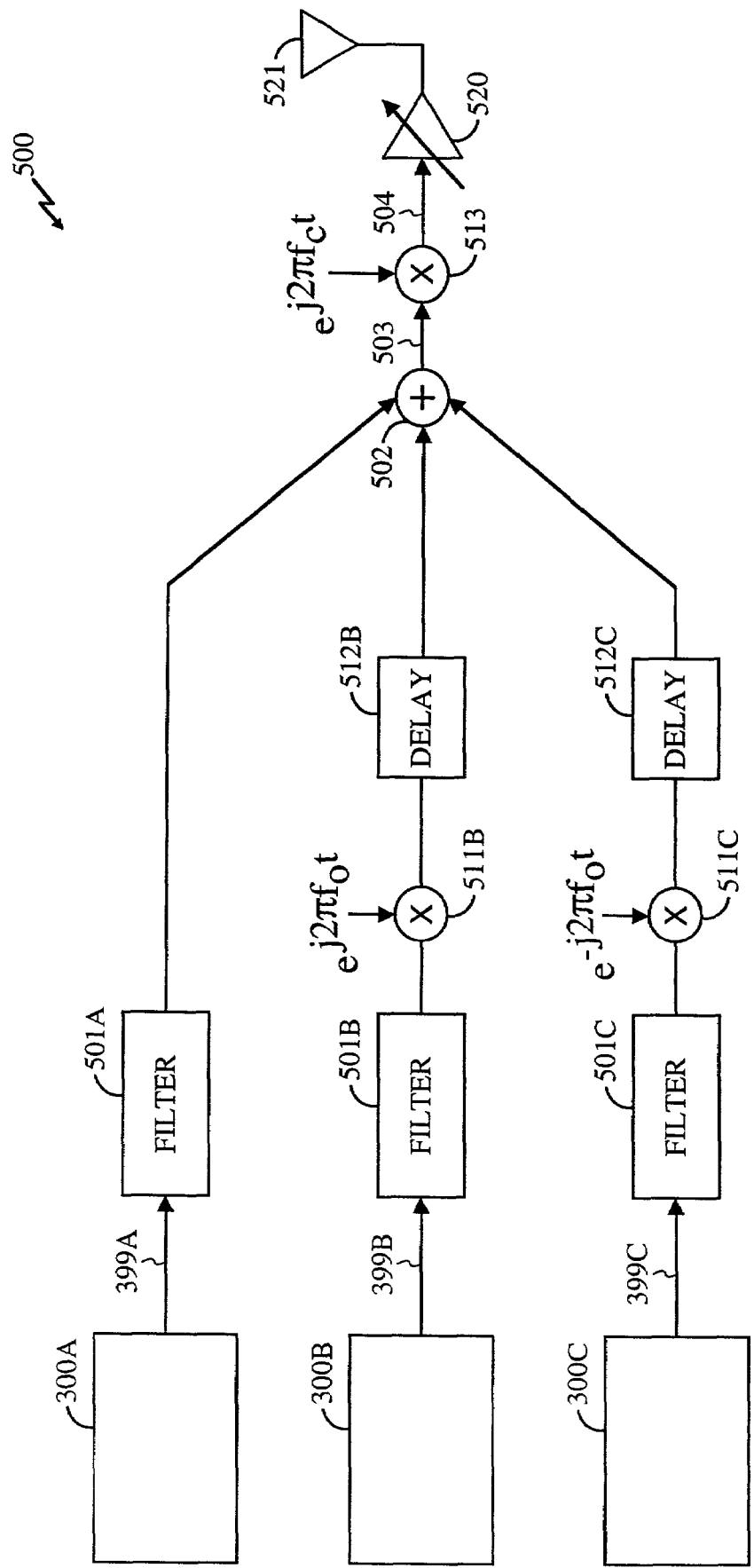
FIG. 5 depicts a transmitter system in accordance with various aspects of the invention.

FIG. 5 depicts a block diagram of a multi-carrier transmitter system 500 in accordance with various aspects of the invention. The multi-carrier transmitter system 500 is shown for a multi-carrier system composing of three carriers. Fewer or higher number of carriers may be used. The blocks 300A, 300B and 300C may operating in accordance with various operating aspects of block 300 shown in FIG. 3 to produce signals 399A, 399B and 399C. The signals 399A-C are modulated and carry the channel data for each respective carrier signal. Each signal passes through a pulse shaping filter, such as filters 501A, 501B and 501C for respectively modulated signals 399A, 399B and 399C. The resulting signals are combined in a combiner 502. However, before combining, the signals are either passed through or up-converted to create a combined signal 503 that may pass through a single process of up-conversion at the carrier frequency "fc" at up-converter 513. The resulting signal 504 may have the frequency spectrum as represented by the curves 460, 461 and 462. To create signal 504 with the corresponding frequency spectrum, one of the signals at the output of filters 501A, 501B and 501C may pass through directly without any up-conversion. The other two signals are passed through frequency up-conversion in blocks 511B and 511C. In accordance with various aspects of the invention, two out of three signals before combining in combiner 502 are delayed. The amount of delay is selected based on the number of carriers in the multi-carrier signal 504. For example, if three carriers are in the multi-carrier signal 504, the amount of delay in a delay block 512B may be set approximately equal to an amount of time as represented by one third of a chip time used in the system. A chip time is equal to the inverse of the PN sequence frequency used in the spreading process of blocks 300A, 300B and 300C. For example, PN sequence of the 1.2288 Mcps may be used. Accordingly, the amount of delay in a delay block 512C may be set approximately equal to an amount of time as represented by two third of a chip time used in the system. As such, the signals at the combiner 502 are delayed from each other. The resulting multi-carrier signal 504 has a reduced PAR, in accordance with various aspects of the invention. An amplifier 520, therefore, may be maintained to operate within its linear operating range. One ordinary skilled in the art may appreciate that the signals represented may be in complex form represented by in-phase and quadrature signals.

In case, the multi-carrier signal is composed of two carriers, the delay of the signal being delayed may be set equal to one half of a chip time. Therefore, as a generalization, the amount of delay is equal to "one chip time/N", where N is equal to the number of carriers in the multi-carrier signal. Such a generalization operates to produce a multi-carrier signal at a reduced PAR. However, if the filters 501A, 501B and 501C do not have a symmetrical pulse shape, the amount of delay may not be equally spaced in time within a chip time or a symbol time. The spacing of the delay times over one chip time or a symbol time would be skewed in accordance with the asymmetrical nature of the pulse shape of the filters. An antenna 521 may be used for transmission of the amplified signal to a destination. The signal may be the forward link signal transmitted to a number of mobile stations in communication system 100.

Figure 6:
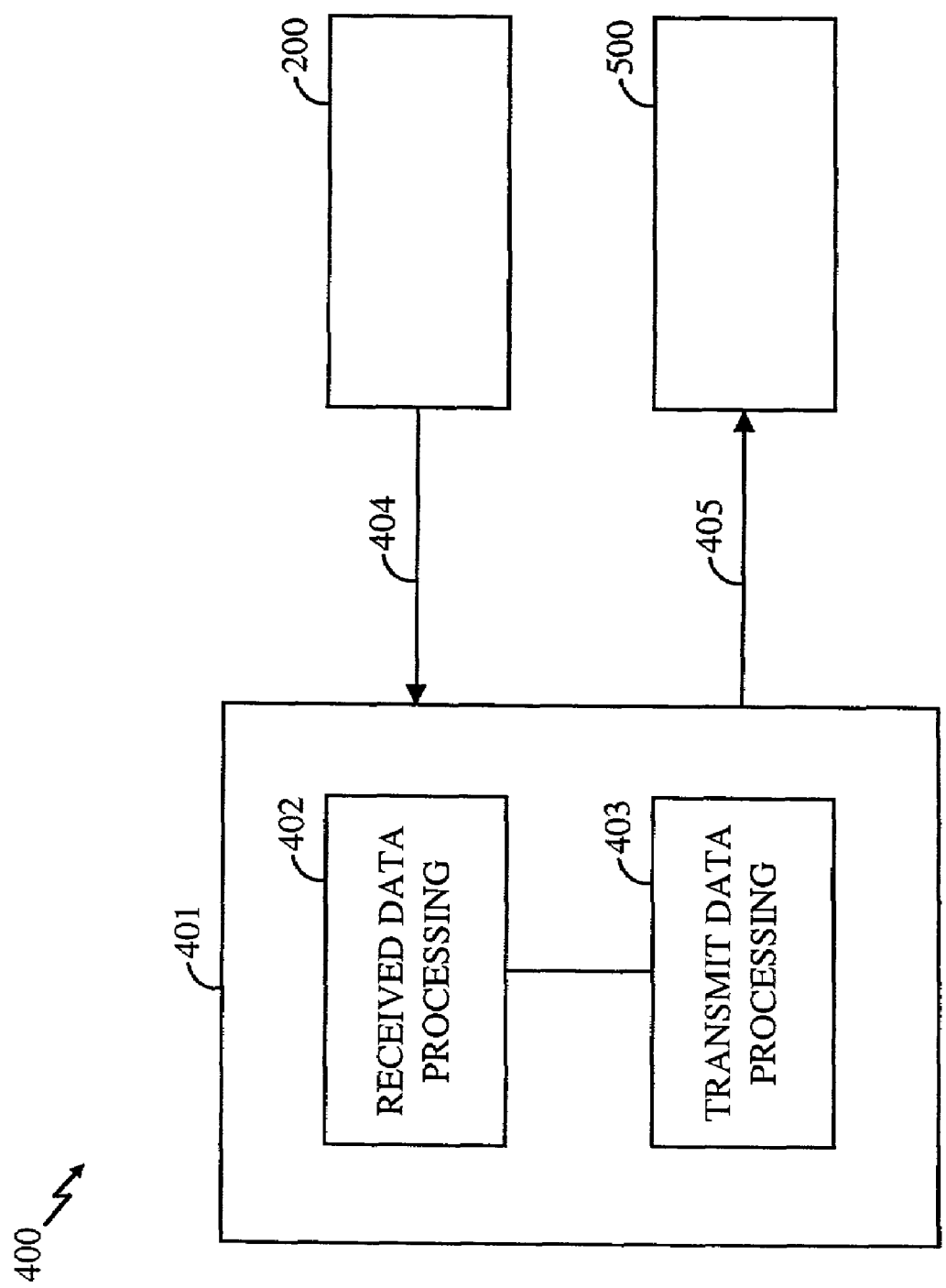
FIG. 6 depicts a transceiver system capable of operating in accordance with various embodiments of the invention.

The transmitter system 500 may be combined with receiver 200 in a transceiver system 400 shown in FIG. 6 for operation in a base station. A processor 401 may be coupled to receiver 200 and transmitter 500 to process the received and transmitted data. Various aspects of the receiver 200 and transmitter 500 may be common, even though receiver 200 and transmitter 500 are shown separately. In one aspect, receiver 200 and transmitter 500 may share a common local oscillator and a common antenna system for RF/IF receiving and transmitting.

On the transmitting side, transmit data processing block 403 prepares the data for transmission on various transmit channels. Transmitter 500 receives the data for transmission on input 405, and transmits the data from an antenna system. On the receiving side, after the received data are decoded, the decoded data are received at processor 400 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or may operate similar to a computer. The device may be connected to a data network, such as Internet. In case of incorporating the transceiver 400 in a base station, the base station through several connections may be connected to a network, such as Internet. In accordance with various aspects of the invention, processor 401 may control the amount of delay in delay blocks 512B and 512C based on the number of carriers in the multi-carrier signal 504.

Figure 7:
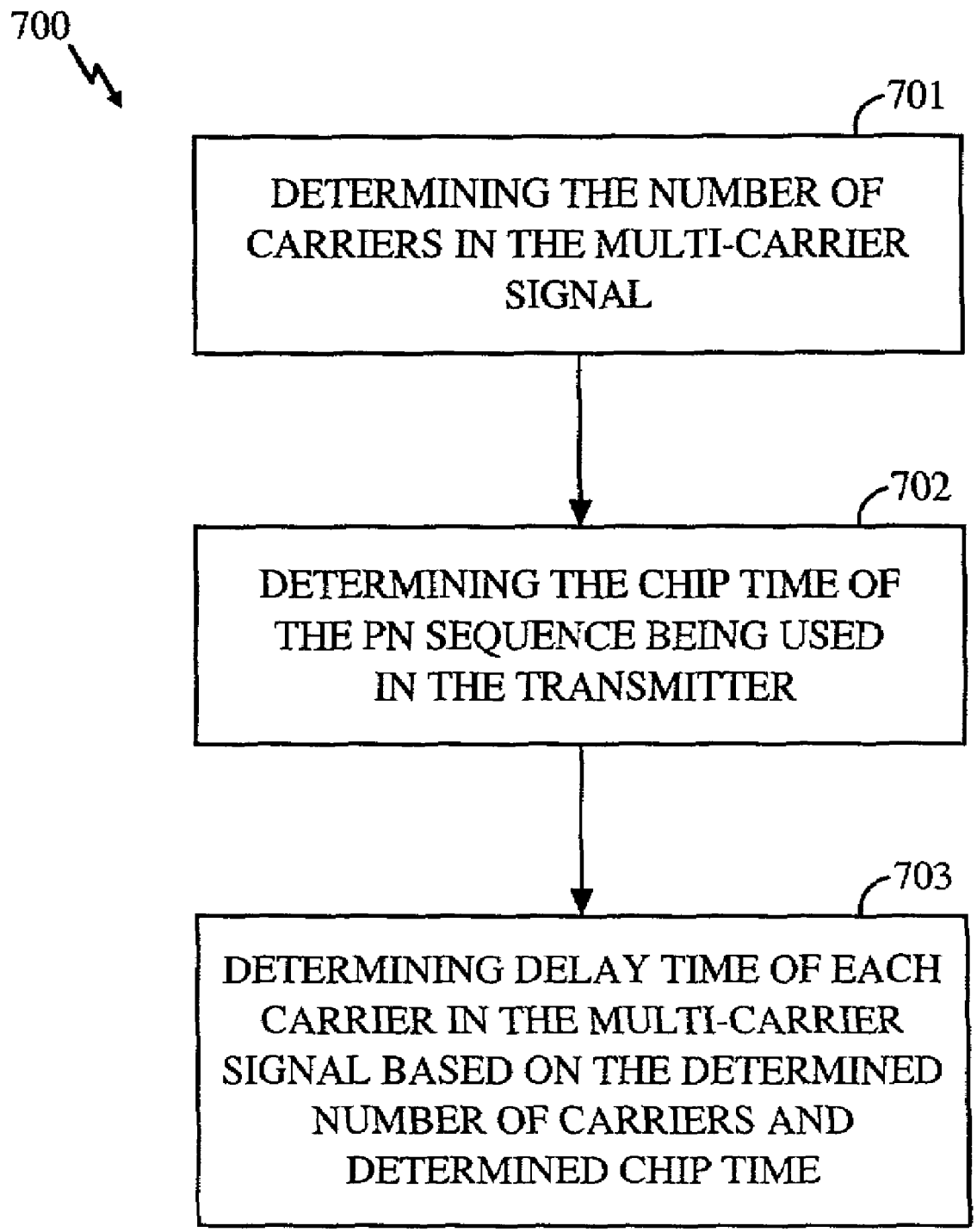
FIG. 7 illustrates various steps for determining delay time of each carrier in the multi-carrier signal in accordance with various aspects of the invention.

Referring to FIG. 7, a flow chart 700 is depicted for determining the delay time of the delay blocks 512B and 512C. At step 701, the processor 401 may determine the number of carriers in the multi-carrier signal 504. At step 702, the processor 401 may determine the chip time of the PN sequence being used in block 300. At step 703, the processor 401 may determine the delay time of each carrier in the multi-carrier signal based on the determined chip time and the number of carriers in the multi-carrier signal 504. One of the carriers is not delayed at all. The delay for other carriers is ⅓ and ⅔ of a chip time for a multi-carrier signal composed of three carriers, for example. The transmitter system 500 may be a digital transmitter system. In order to determine the delay time and delay the carrier signals in delay blocks 512B and 512C, the digital samples of the signals may need to go through a process of decimation or interpolation to have proper number of samples for the delay process. The delaying process may be based on a number of signal samples. For example, if the signals are produced at the sampling frequency of two samples per chip, the samples are interpolated by a factor of three and decimated by a factor of two to produce signals at three samples per chip. In this case, one of the carriers is delayed by one sample and the other by two samples to produce delayed signals. The delayed signals are, therefore, delayed by ⅓ chip time and ⅔ chip time respectively.

In a system that utilizes the FDMA techniques, the delay of each signal may be based on the number of carriers in the multi-carrier signal and the data symbol duration. For example, in case of a three carrier multi-carrier signal, the delay is set at ⅓ and ⅔ of a symbol time.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for producing a multi-carrier signal at a reduced peak to average power ratio, comprising:
   a control system for determining a N number of carriers in said multi-carrier signal, N being greater than one, determining chip time of a spreading sequence used for spreading said number of carriers and determining one or more delay times for N-1 carriers based on said determined number of carriers and said determined chip time, wherein one delay time is approximately equal to the chip time divided by N, and wherein said chip time is approximately equal to the inverse of the spreading sequence frequency;
   at least one first up-converter for up-converting each of the N-1 carriers to a frequency, wherein each of the N-1 carriers are up-converted to a different frequency;
   means for delaying N-1 carriers by said determined one or more delay times;
   a combiner for combining the N-1 delayed carriers with a single non-delayed carrier to produce a reduced peak to average power ratio multi-carrier signal; and
   a second up-converter for up-converting the combined carriers to a single carrier frequency.

2. The apparatus as recited in claim 1 further comprising:
   a transmitter for transmitting said reduced peak to average power ratio multi-carrier signal.

3. The apparatus as recited in claim 2 wherein said transmitter includes a power amplifier for amplifying said reduced peak to average power ratio multi-carrier signal before transmission.

4. A method for producing a multi-carrier signal at a reduced peak to average power ratio, comprising:
   determining a N number of carriers in said multi-carder signal, N being greater than one, determining chip time of a spreading sequence used for spreading said number of carriers and determining one or more delay times for N-1 carriers based on said chip time and said determined number of carriers, wherein one delay time is approximately equal to the chip time divided by N, and wherein said chip time is approximately equal to the inverse of the spreading sequence frequency;
   at least one first up-converter for up-converting each of the N-1 carriers to a frequency, wherein each of the N-1 carriers are up-converted to a different frequency;
   delaying N-1 carriers by said determined one or more delay times;
   combining the N-1 delayed carriers with a single non-delayed carrier to produce a reduced peak to average power ratio multi-carrier signal; and
   a second up-converter for up-converting the combined carriers to a single carrier frequency.

5. The method as recited in claim 4 further comprising:
transmitting said reduced peak to average power ratio multi-carder signal.

6. The method as recited in claim 5 wherein said transmitting includes amplifying said reduced peak to average power ratio multi-carrier signal before transmitting.

7. An apparatus for producing a multi-carrier signal at a reduced peak to average power ratio, comprising:
a plurality of modulators for modulating data for transmission over said multi-carrier signal, thereby producing a corresponding plurality of N modulated carder signals;
at least one first up-converter for up-converting N-1 modulated carrier signals to a frequency, wherein each of the N-1 modulated carrier signals are up-converted to a different frequency;
means for delaying N-1 modulated carrier signals by one or more determined delay times, wherein said delay times are based on the N number of carriers in said plurality of modulated carrier signals and chip time of a spreading sequence used for spreading said plurality of modulated carrier signals, one delay time is approximately equal to the chip time divided by N, and the chip time is approximately equal to the inverse of the spreading sequence frequency;
a combiner for combining the N-1 delayed plurality of modulated carrier signals with a single non-delayed modulated carrier signal to produce a reduced peak to average power ratio multi-carrier signal; and
a second up-converter for up-converting the combined modulated carrier signals to a single carrier frequency.

8. The apparatus as recited in claim 7 further comprising:
a transmitter for transmitting said reduced peak to average power ratio multi-carrier signal.

9. The apparatus as recited in claim 8 wherein said transmitter includes a power amplifier for amplifying said reduced peak to average power ratio multi-carrier signal before transmission.

10. A method for producing a multi-carrier signal at a reduced peak to average power ratio, comprising:
modulating data for transmission over said multi-carrier signal, thereby producing a corresponding plurality of N modulated carrier signals;
up-converting N-1 modulated carrier signals to a frequency using at least one first up-converter, wherein each of the N-1 modulated carrier signals are up-converted to a different frequency;
delaying N-1 modulated carrier signals by one or more determined delay times, wherein said delay times are based on the N number of carriers in said plurality of modulated carrier signals and chip time of a spreading sequence used for spreading said plurality of modulated carrier signals, one delay time is approximately equal to the chip time divided by N, and the chip time is approximately equal to the inverse of the spreading sequence frequency;
combining the N-1 delayed plurality of modulated carrier signals with a single non-delayed modulated carrier signal to produce a reduced peak to average power ratio multi-carrier signal; and
up-converting the combined modulated carrier signals to a single carrier frequency using a second up-converter.

11. The method as recited in claim 10 further comprising:
transmitting said reduced peak to average power ratio multi-carrier signal.

12. The method as recited in claim 11 wherein said transmitting includes amplifying said reduced peak to average power ratio multi-carrier signal before transmitting.

13. An apparatus for producing a multi-carrier signal, the apparatus comprising:
a plurality of transmit channel processing blocks configured to spread each of a plurality of N carriers using a spreading sequence having a chip time, N being greater than one;
at least one first up-converter configured to up-convert N-1 carriers to a frequency, wherein each of the N-1 carriers are up-converted to a different frequency;
at least one delay block configured to delay one carrier of the plurality of carriers by a delay time based on the chip time, the delay time being approximately equal to the chip time divided by N, the chip time being approximately equal to the inverse of the spreading sequence frequency;
a combiner configured to combine the plurality of carriers to produce the multi-carrier signal; and
a second up-converter configured to up-convert the combined plurality of carriers to a single carrier frequency.

14. An apparatus in accordance with claim 13, wherein the at least one delay block comprises:
a plurality of delay blocks, each delay block configured to delay one of the plurality of carriers by a unique delay time based on the chip time and the total number of carriers to produce a plurality of delayed carriers such that the multi-carrier signal has a reduced peak to average power ratio.

15. An apparatus in accordance with claim 14, where the unique delay time is a multiple of a ratio of the chip time to the total number of carriers.

16. An apparatus in accordance with claim 15, further comprising:
a control system configured to determine the unique delay times.

17. A method for reducing a peak to average power ratio of a multi-carrier signal, the method comprising:
spreading each of a plurality of N carriers using a spreading sequence having a chip time, N being greater than one;
up-converting N-1 carriers to a frequency using at least one first up-converter, wherein each of the N-1 carriers are up-converted to a different frequency;
delaying at least one carrier of the plurality of carriers by a delay time based on the chip time, the delay time being approximately equal to the chip time divided by N, the chip time being approximately equal to the inverse of the spreading sequence frequency;
combining the plurality of carriers to produce the multi-carrier signal; and
up-converting the combined plurality of carriers to a single carrier frequency using a second up-converter.

18. A method in accordance with claim 17, wherein the delaying comprises:
delaying each of the plurality of carriers by a unique delay time based on the chip time and the total number of carriers to produce a plurality of delayed carriers such that the multi-carrier signal has a reduced peak to average power ratio.

19. A method in accordance with claim 18, where the unique delay time is a multiple of a ratio of the chip time to the total number of carriers.

20. A method in accordance with claim 19, further comprising:
determining the unique delay times.

* * * * *